United States Patent
Krull et al.

(10) Patent No.: US 10,665,908 B2
(45) Date of Patent: May 26, 2020

(54) HEATING AND COOLING RESERVOIR FOR A BATTERY POWERED VEHICLE

(71) Applicant: Tesla, Inc., Palo Alto, CA (US)

(72) Inventors: Justin Thomas Krull, San Jose, CA (US); Prem Mark Pinto, Vancouver (CA)

(73) Assignee: Tesla, Inc., Palo Alto, CA (US)

( * ) Notice: Subject to any disclaimer, the term of this patent is extended or adjusted under 35 U.S.C. 154(b) by 221 days.

(21) Appl. No.: 15/627,936

(22) Filed: Jun. 20, 2017

(65) Prior Publication Data

US 2017/0373359 A1    Dec. 28, 2017

Related U.S. Application Data

(60) Provisional application No. 62/353,763, filed on Jun. 23, 2016.

(51) Int. Cl.
*H01M 10/613* (2014.01)
*B60K 11/02* (2006.01)
(Continued)

(52) U.S. Cl.
CPC ........... *H01M 10/613* (2015.04); *B60K 11/02* (2013.01); *H01M 10/63* (2015.04);
(Continued)

(58) Field of Classification Search
CPC ........... H01M 10/613; H01M 10/6567; H01M 10/63; B60K 11/02
(Continued)

(56) References Cited

U.S. PATENT DOCUMENTS 6,162,555 A * 12/2000 Gutierrez et al. ...... H01M 2/36
                                                                                    429/404
2004/0238035 A1* 12/2004 Svendsen et al. ... B60K 15/077
                                                                                    137/265
(Continued)

FOREIGN PATENT DOCUMENTS

FR        2980057 A1    3/2013
FR        3030383 A1    6/2016

OTHER PUBLICATIONS

International Searching Authority; International Search Report and Written Opinion; International Application No. PCT/US2017/038596, dated Dec. 20, 2017; 19 pgs.

*Primary Examiner* — Kevin L Lee
(74) *Attorney, Agent, or Firm* — Knobbe Martens Olson & Bear LLP

(57) ABSTRACT

An integrated coolant bottle assembly includes a reservoir configured for use in a thermal system. Examples of such thermal systems include a cooling/heating system of a battery powered electric vehicle, electric power generators (e.g., motor-based systems), other physical plant installations, etc. Such a reservoir includes a first section and a second section. The second section is joined to the first section at a reservoir interface thereby forming the reservoir that is configured for storage and/or flow of a liquid medium. The first section may include an integrated channel that provides a pathway for the flow of the liquid medium. The reservoir may also include a component interface configured to facilitate connection of a component thereto (e.g., a pump, a battery pump, a powertrain pump, a chiller, a heater, a filter, an aerator, a valve, a connector, a fan, or a radiator).

20 Claims, 11 Drawing Sheets

(51) Int. Cl.
*H01M 10/63* (2014.01)
*H01M 10/6567* (2014.01)
*B60K 1/00* (2006.01)

(52) U.S. Cl.
CPC ... *H01M 10/6567* (2015.04); *B60K 2001/003* (2013.01); *B60K 2001/008* (2013.01); *H01M 2220/20* (2013.01)

(58) Field of Classification Search
USPC .......................................................... 137/265
See application file for complete search history.

(56) References Cited

U.S. PATENT DOCUMENTS

| | | |
|---|---|---|
| 2007/0044938 A1 | 3/2007 | Farley |
| 2009/0151903 A1 | 6/2009 | Na et al. |
| 2012/0168118 A1 | 7/2012 | Myers et al. |
| 2014/0342201 A1* | 11/2014 | Andres ............ H01M 10/6567 429/62 |
| 2014/0360210 A1* | 12/2014 | Lapp et al. ............ F25B 1/053 62/84 |

* cited by examiner

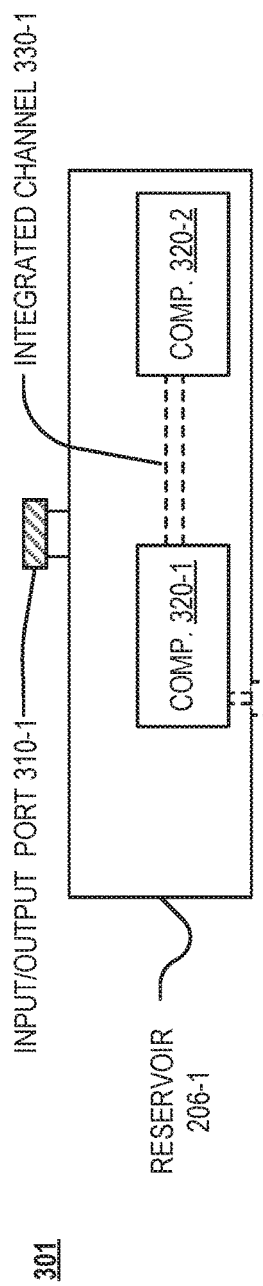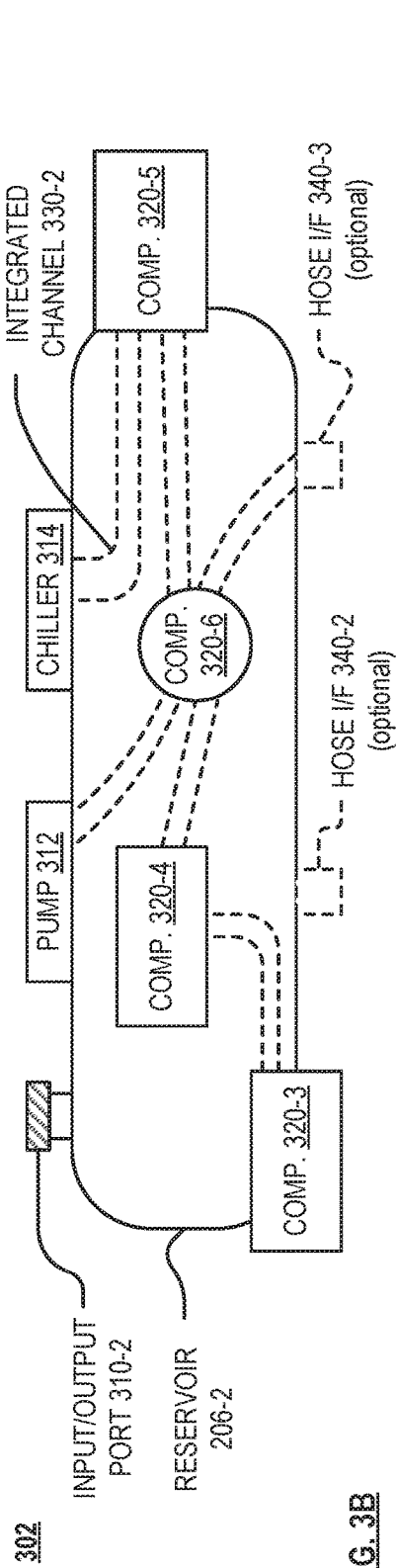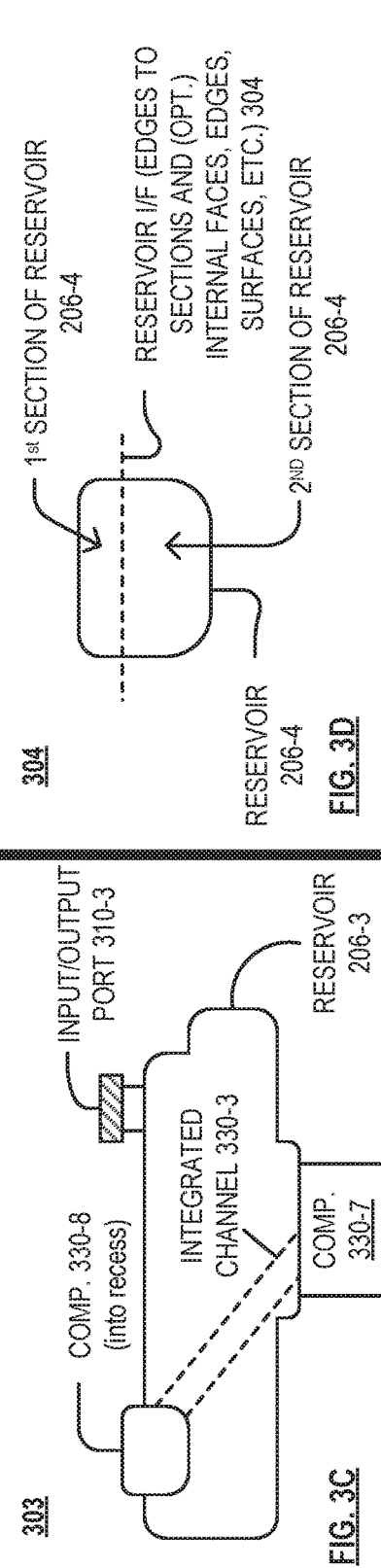

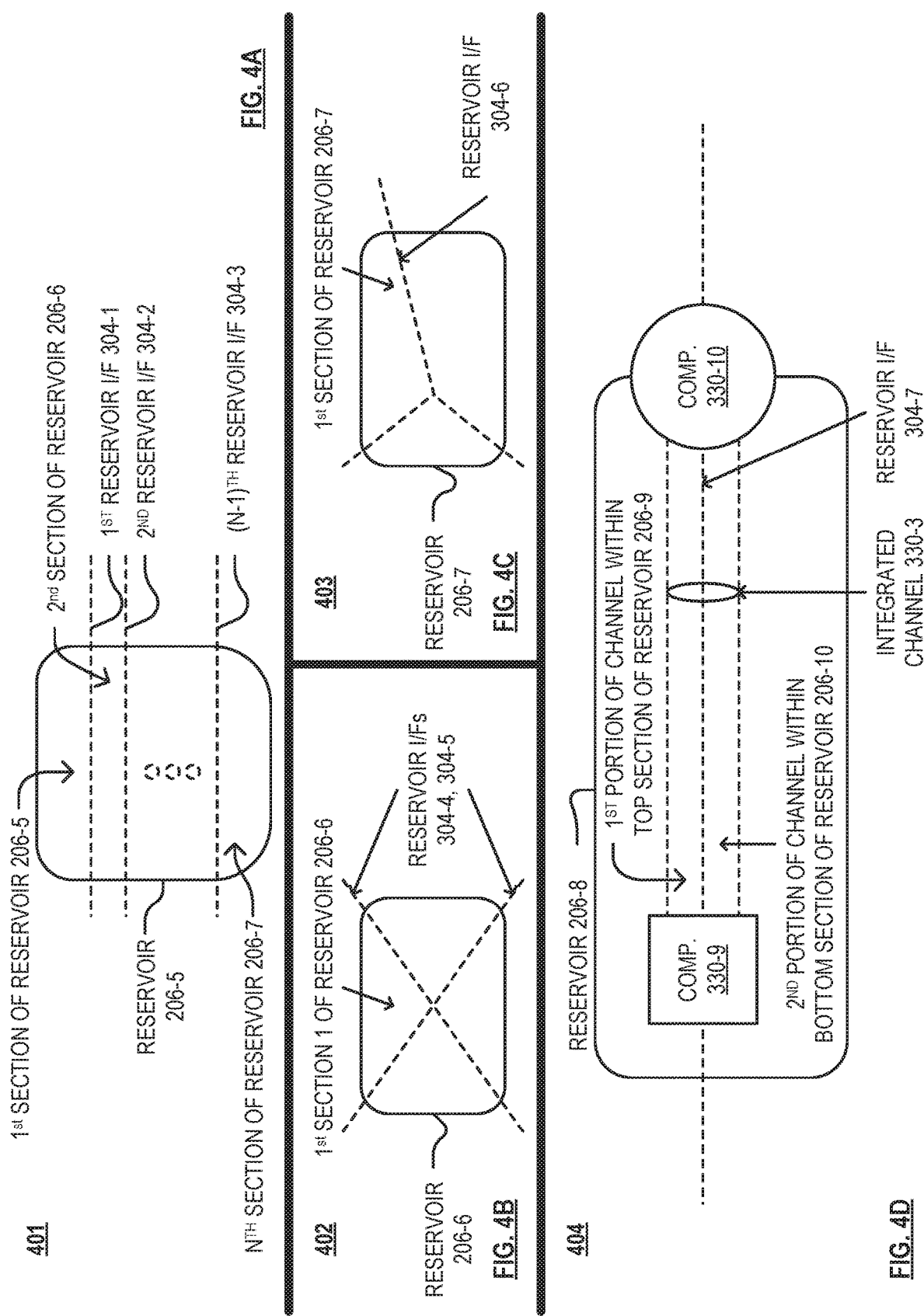

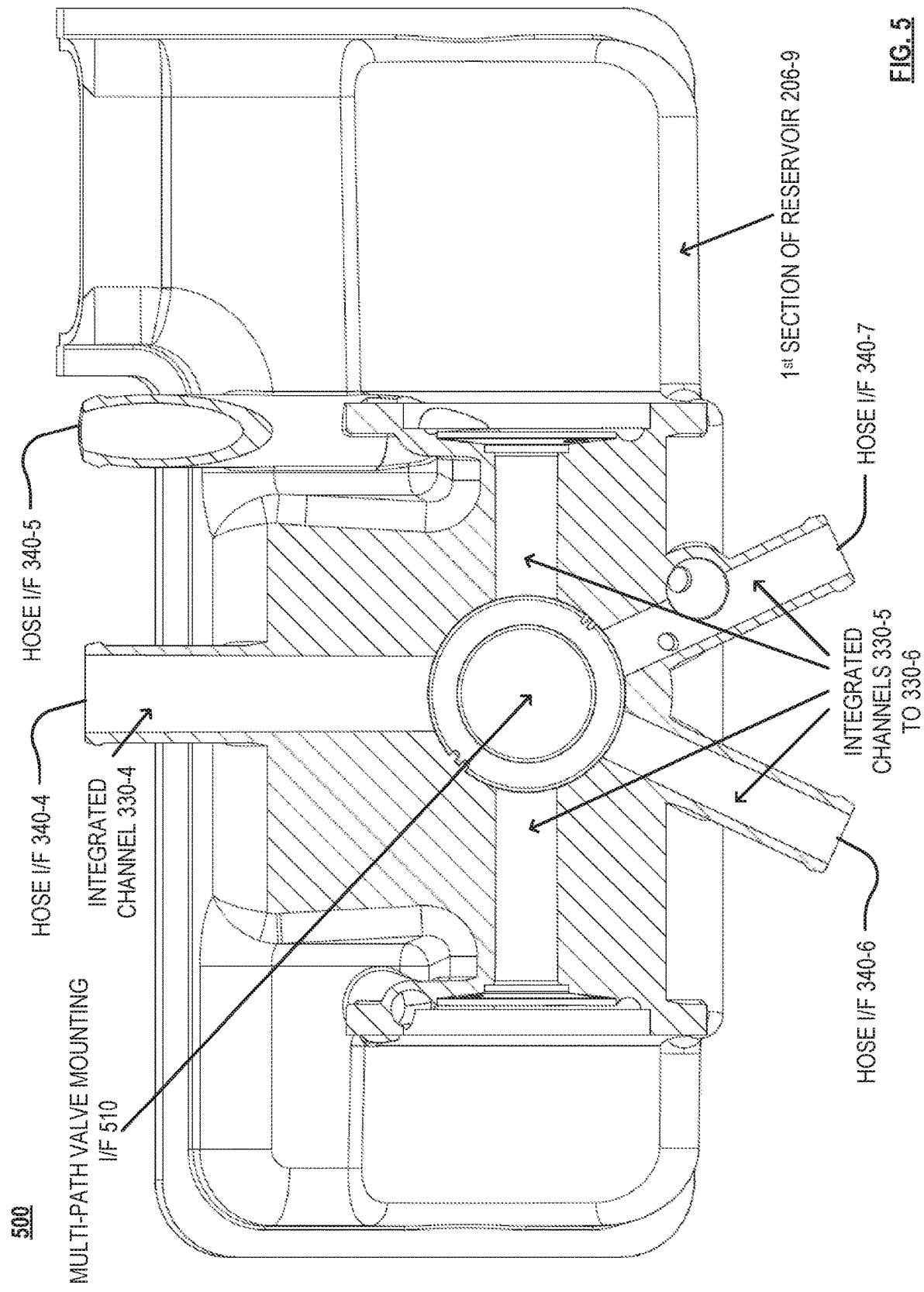

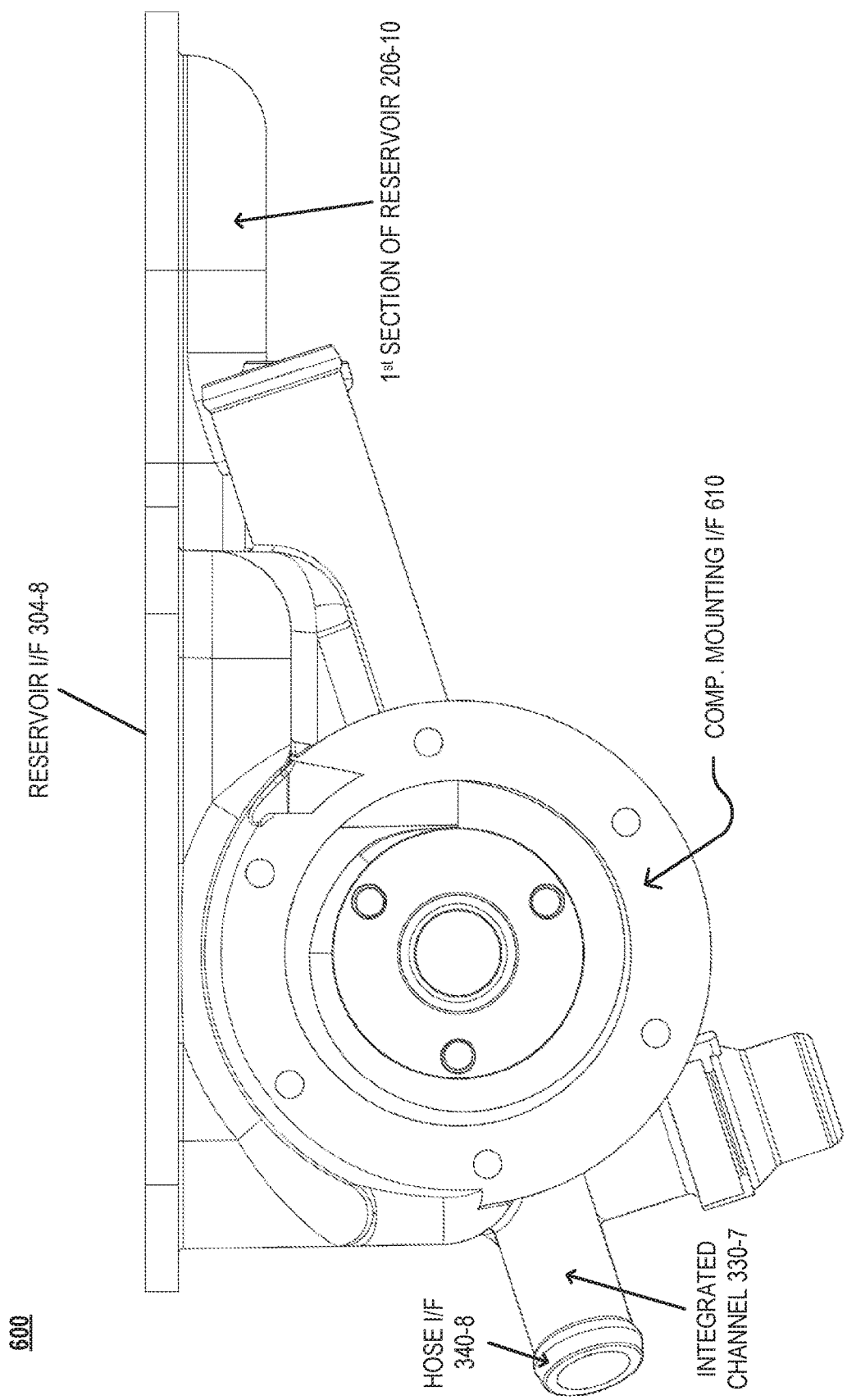

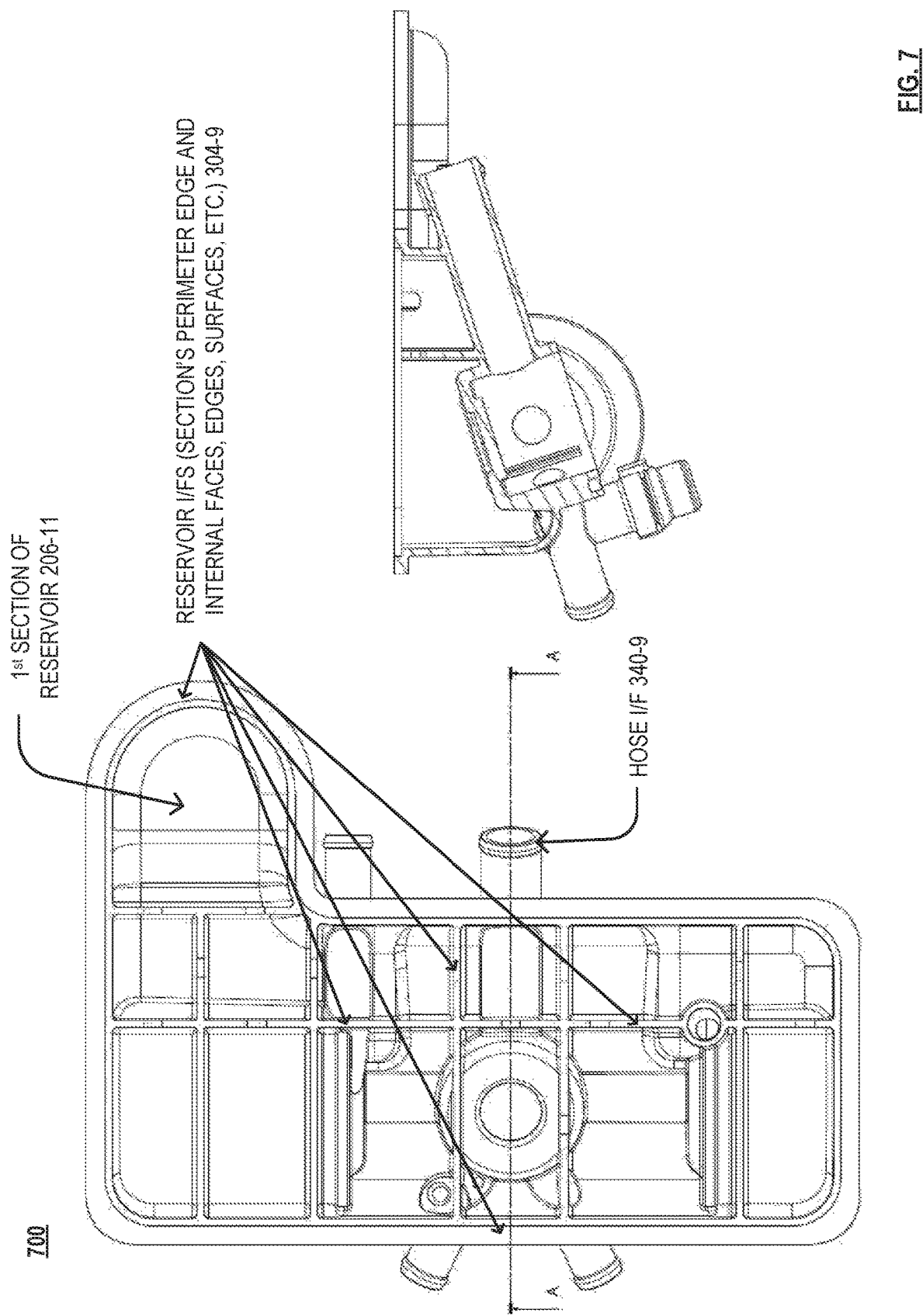

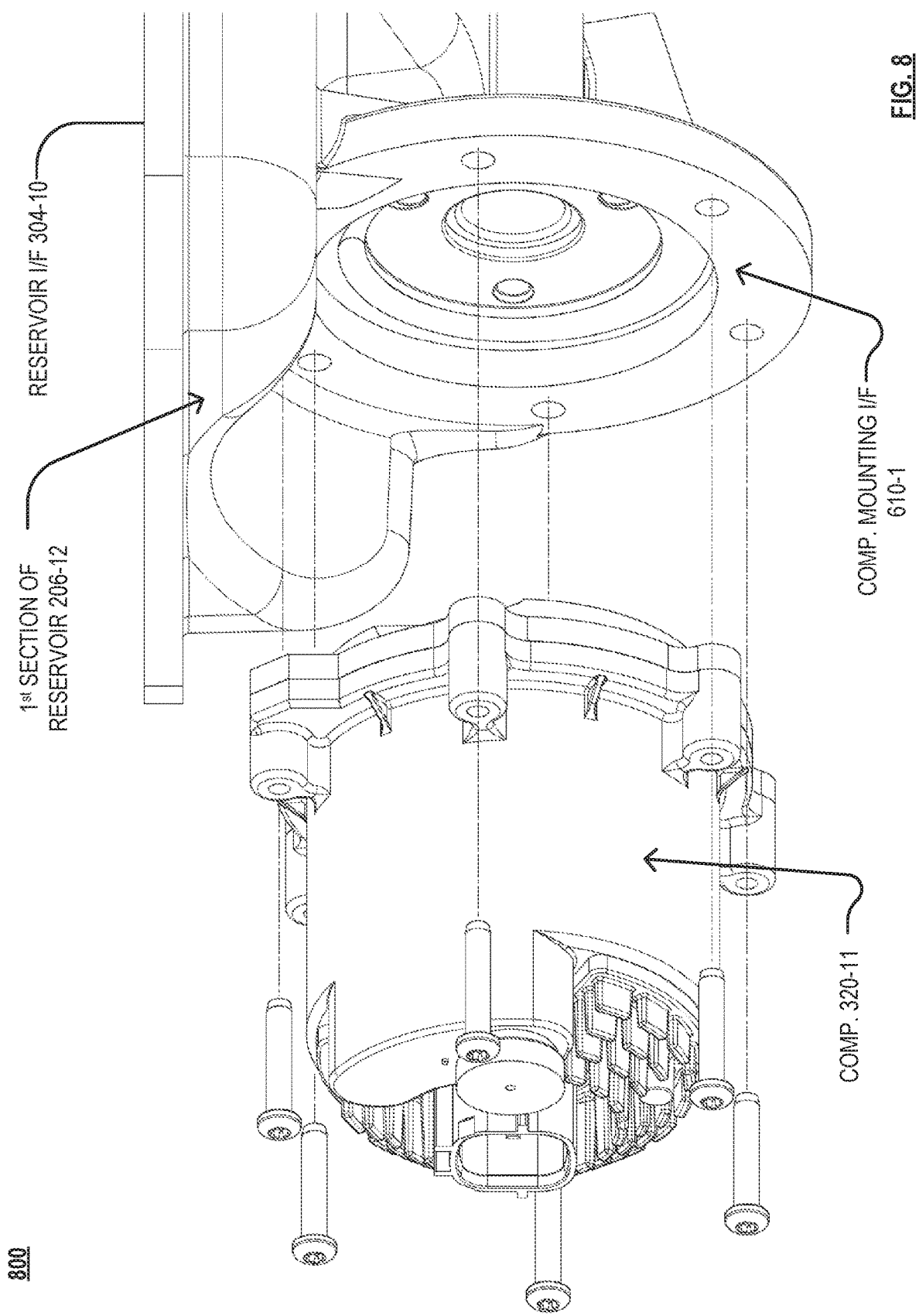

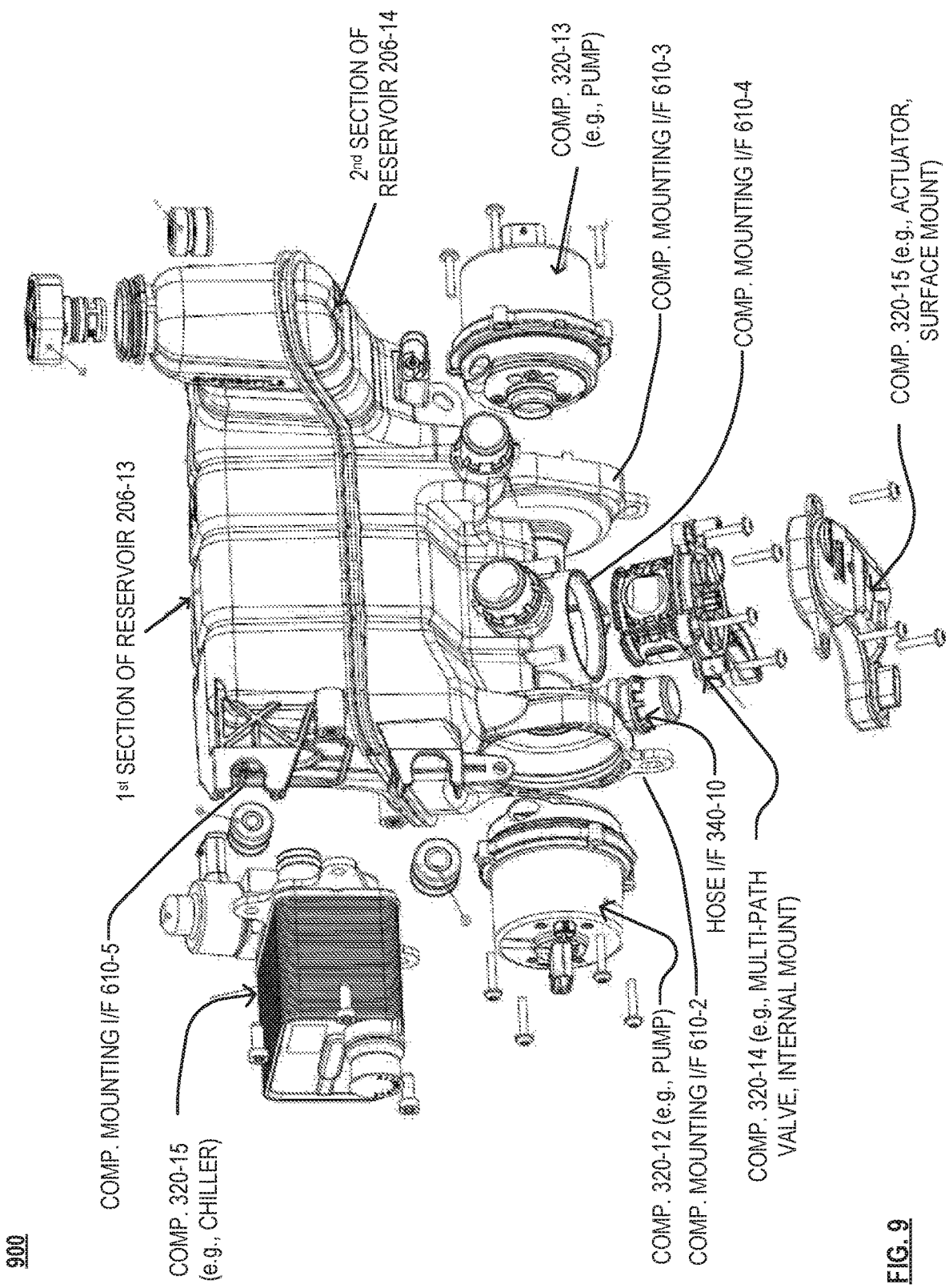

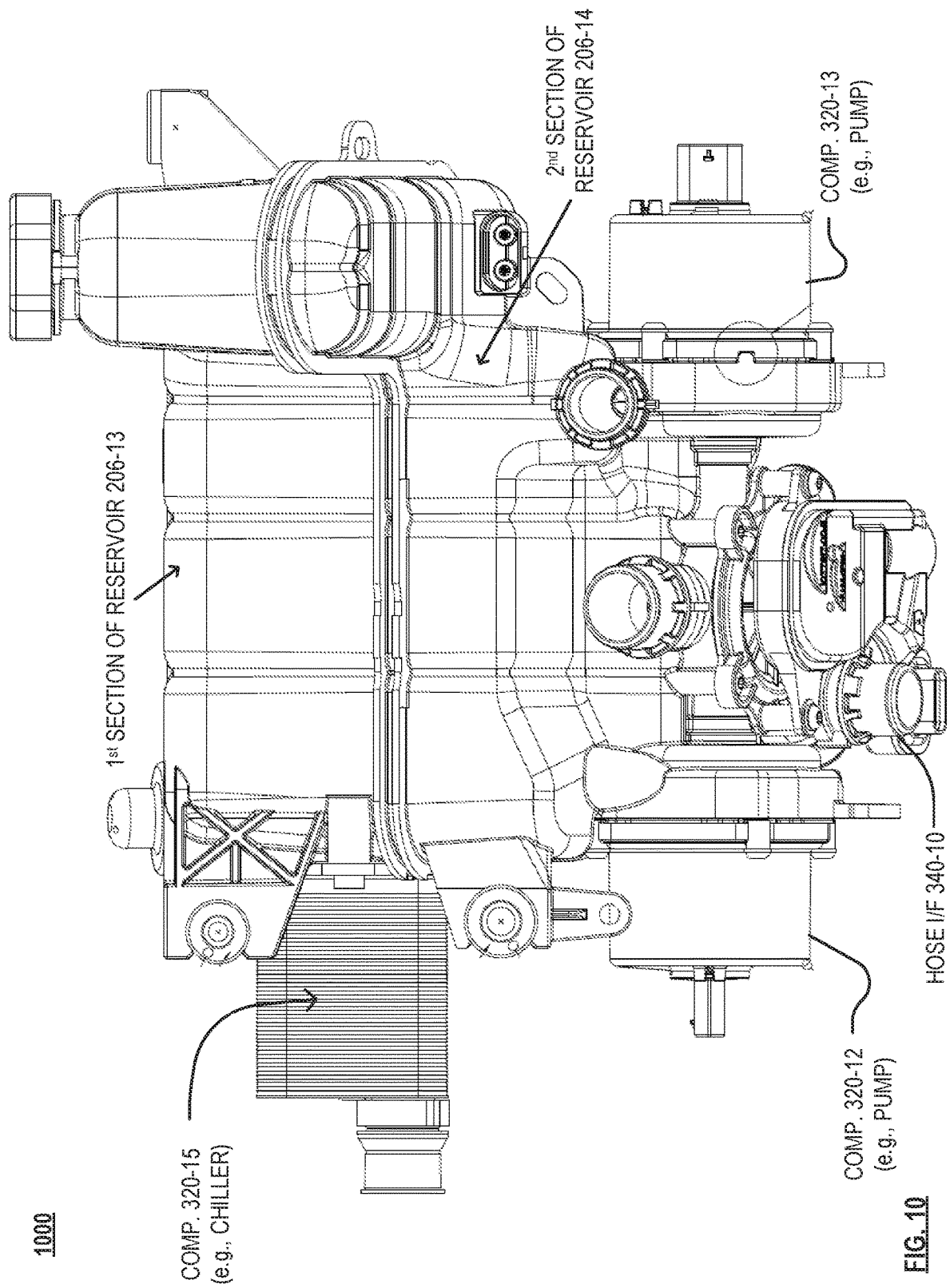

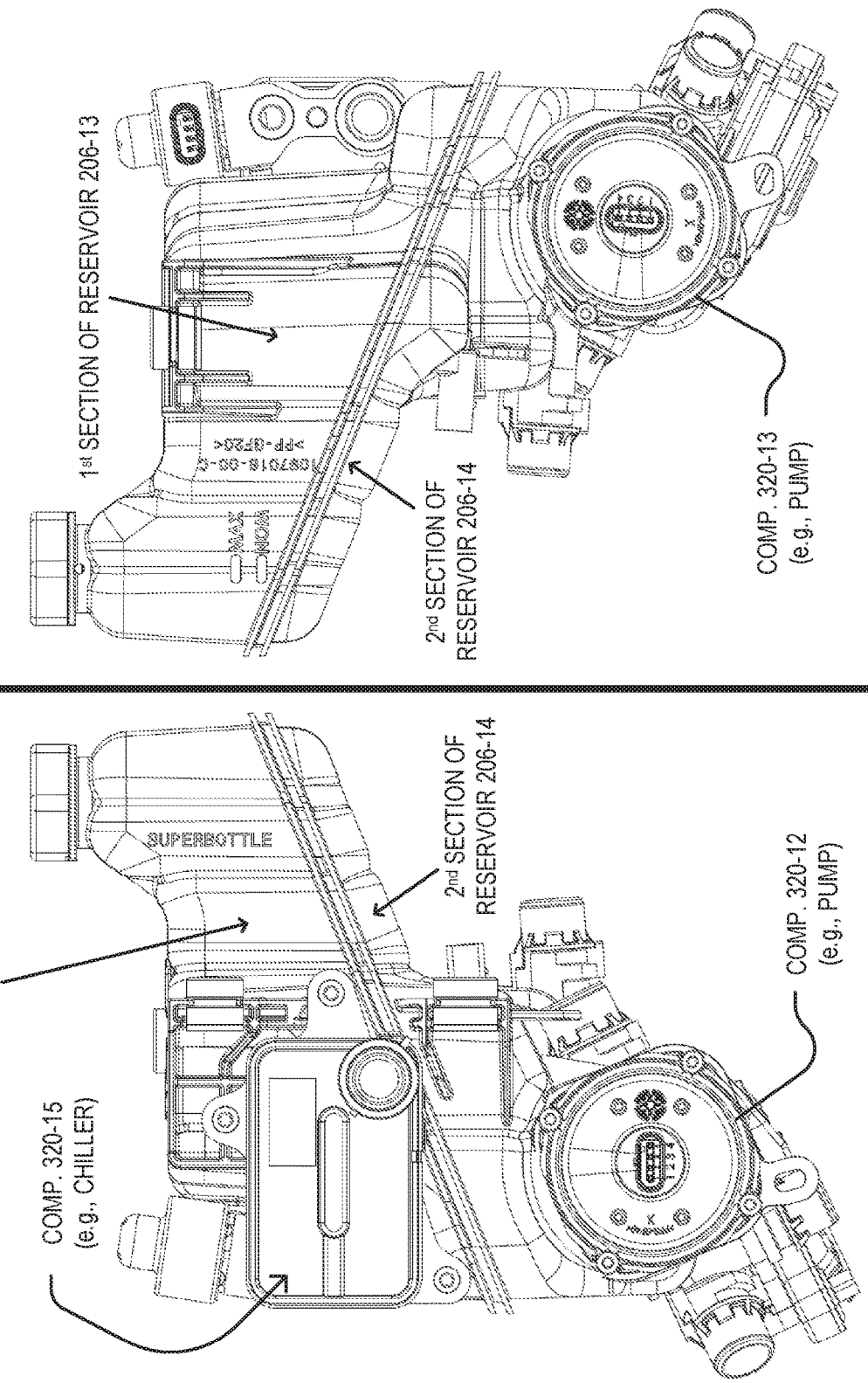

HEATING AND COOLING RESERVOIR FOR A BATTERY POWERED VEHICLE

CROSS REFERENCE TO RELATED PATENTS/PATENT APPLICATIONS

The present U.S. Utility patent application claims priority pursuant to 35 U.S.C. § 119(e) to U.S. Provisional App. Ser. No. 62/353,763, entitled "INTEGRATED COOLANT BOTTLE ASSEMBLY," filed Jun. 23, 2016, which is hereby incorporated herein by reference in its entirety and made part of the present U.S. Utility patent application for all purposes.

BACKGROUND

Technical Field

The present disclosure relates generally to thermal management systems; and, more particularly, to thermal management systems such as those that may be implemented within vehicles.

Description of Related Art

Electric motors can generate considerable heat, especially in the traction motor of a vehicle where size and weight constraints are coupled with the need for high power output. Electric motor overheating causes the motor winding insulation to deteriorate quickly. For every 10-degree Celsius rise in electric motor temperature, insulation life is cut in half. Another issue caused by overheating is that permanent magnets in the rotor lose their magnetic properties as they overheat, resulting in a loss of efficiency. For induction motors, an increase in temperature of the copper windings reduces efficiency of the induction motor—copper electrical resistivity increases 4% for every 10-degree Celsius temperature increase. Thus, it is important to cool the internal motor components (e.g., rotor) as well as the outer motor components (e.g., case, stator). The architecture of the electric motor cooling system must operate efficiently with large variations in ambient operating environment as the electric motor may be subjected to a wide range of ambient temperatures, humidity levels, and/or dust/dirt levels.

The prior art solutions for thermal systems that perform cooling of various components within a vehicle typically include a coolant reservoir that stores coolant of some desired material that then gets passed via hosing to one or more other components within the vehicle. For example, the coolant reservoir is typically located in one location and is interconnected with one or more other components that are separately located via hosing. Such a prior art implementation provides a significant number of connections, hosing, fasteners, etc. and also provides a large number of possible failure points within the overall thermal system.

In addition, such a prior art implementation can be very time-consuming and labor-intensive when assembling a vehicle that includes such a prior art thermal system. For example, a prior art coolant reservoir assembly will typically require mounting of multiple discrete components to the vehicle, the interconnection of multiple electrical connectors for different components, and the connection of multiple hoses and hose clamps to route the flow of coolant to these various components located in different respective locations. The multi-faceted construction and assembly of these parts is time-intensive and gives rise to multiple points of potential failure in hoses, clamps, electrical connections, etc.

Furthermore, the need to weld the typical coolant bottle housing portions often necessitates multiple weld points along the inlet and outlet channels of the structure, such that the weld lines and residue from the welding process are introduced into the flow channels of the inlets and outlets, compromising the smoothness and fluidity of the channel and reducing efficiency of liquid flow through the channel.

BRIEF DESCRIPTION OF THE SEVERAL VIEWS OF THE DRAWINGS

FIG. 3A is a diagram illustrating an example of a reservoir for use within a thermal system in accordance with the present invention.

FIG. 3B is a diagram illustrating another example of a reservoir for use within a thermal system in accordance with the present invention.

FIG. 3C is a diagram illustrating another example of a reservoir for use within a thermal system in accordance with the present invention.

FIG. 3D is a diagram illustrating another example of a reservoir for use within a thermal system in accordance with the present invention.

FIG. 4A is a diagram illustrating another example of a reservoir for use within a thermal system in accordance with the present invention.

FIG. 4B is a diagram illustrating another example of a reservoir for use within a thermal system in accordance with the present invention.

FIG. 4C is a diagram illustrating another example of a reservoir for use within a thermal system in accordance with the present invention.

FIG. 4D is a diagram illustrating another example of a reservoir for use within a thermal system in accordance with the present invention.

FIG. 5 is a diagram illustrating an example of a portion of a reservoir for use within a thermal system in accordance with the present invention.

FIG. 6 is a diagram illustrating another example of a portion of a reservoir for use within a thermal system in accordance with the present invention.

FIG. 7 is a diagram illustrating another example of a portion of a reservoir for use within a thermal system in accordance with the present invention.

FIG. 8 is a diagram illustrating another example of a portion of a reservoir for use within a thermal system in accordance with the present invention.

FIG. 9 is a diagram illustrating another example of a reservoir for use within a thermal system in accordance with the present invention.

FIG. 10 is a diagram illustrating another perspective of the example of the reservoir of FIG. 9.

FIG. 11A is a diagram illustrating a side view of the perspective of the example of the reservoir of FIG. 9 and FIG. 10.

FIG. 11B is a diagram illustrating another side view of the perspective of the example of the reservoir of FIG. 9 and FIG. 10.

DETAILED DESCRIPTION OF THE DISCLOSURE

Figure 1:
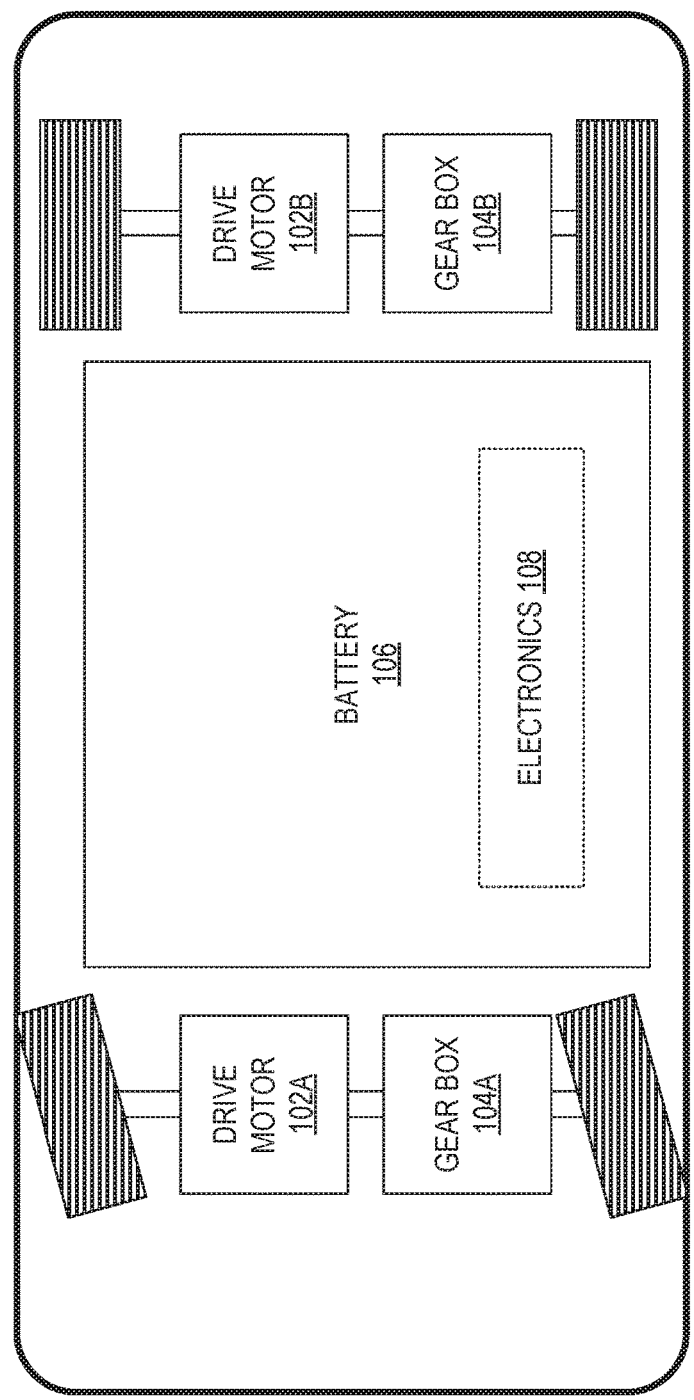
FIG. 1 is a diagram illustrating an example of basic components of a battery powered electric vehicle.

FIG. 1 illustrates an example 100 of basic components of a battery powered electric vehicle (electric vehicle). The electric vehicle includes at least one drive motor (traction motor) 102A and/or 102B, at least one gear box 104A and/or 104B coupled to a corresponding drive motor 102A and/or 102B, a battery 106 and electronics 108. Generally, the battery 106 provides electricity to the power electronics of the electric vehicle and to propel the electric vehicle using the drive motor 102A and/or 102B. The electric vehicle includes a large number of other components that are not described herein but known to one of ordinary skill. While the construct of the electric vehicle of FIG. 1 is shown to have four wheels, differing electric vehicles may have fewer or more than four wheels. Further, differing types of electric vehicles may incorporate the inventive concepts described herein, including motor cycles, aircraft, trucks, boats, train engines, among other types of vehicles.

Various operational issues with the electric vehicle are described herein in conjunction with various embodiments. One of these operational issues relates to the cooling of the drive motor 102A or 102B. Another of these operational issues relates to control of operating temperature of the battery 106. Still another of these operational issues relates to protection of the drive motor 102A or 102B from electrical discharge. Subsequent description herein may relate back to the components of this FIG. 1. Common numbering may be used to refer to components identified in further FIGs. described herein.

Figure 2:
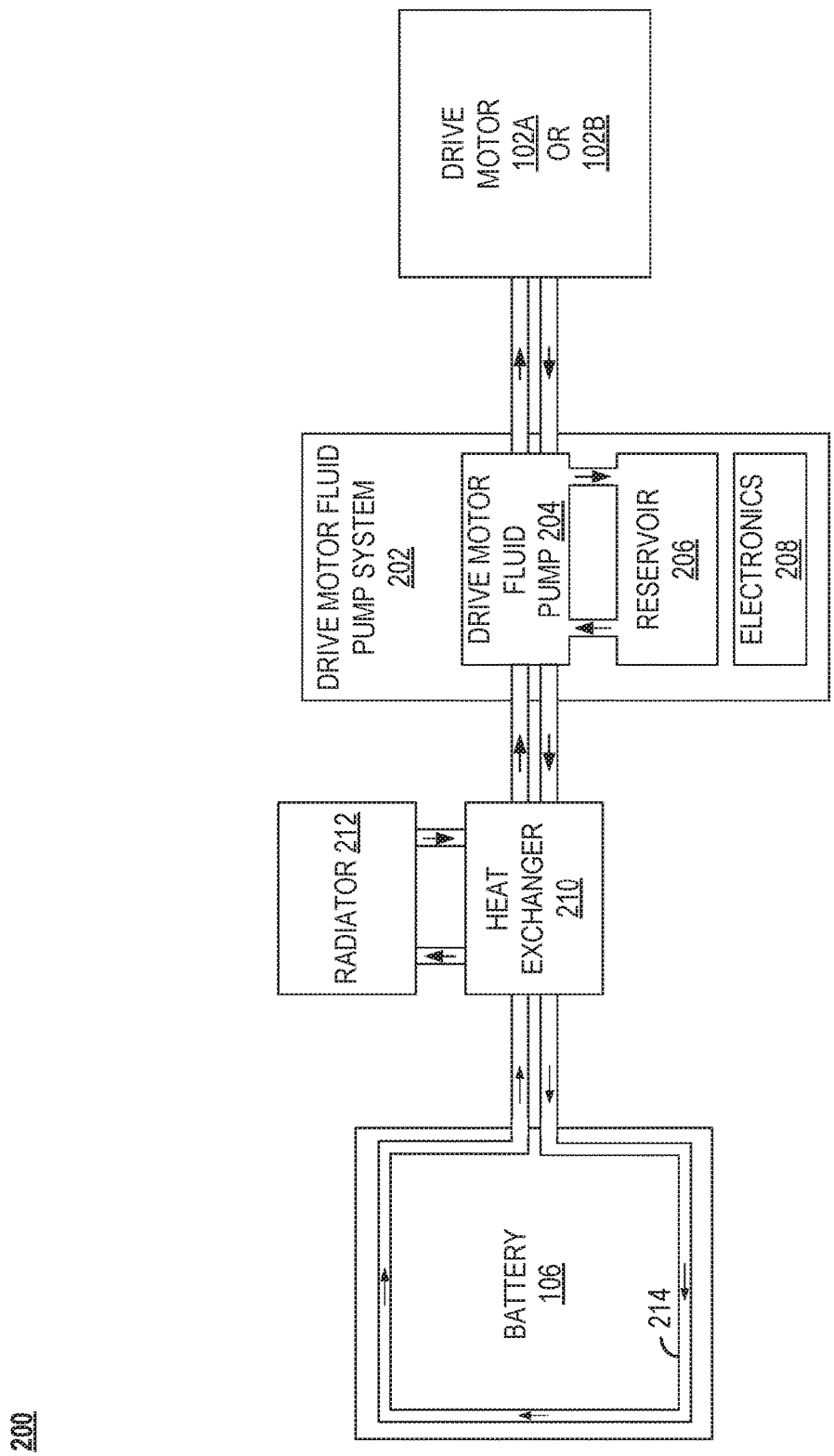
FIG. 2 is a diagram illustrating an example of components of a drive motor cooling system and a battery heating system, both constructed and operating according to a disclosed embodiment.

FIG. 2 illustrates an example 200 of components of a drive motor cooling system and a battery heating system, both constructed and operating according to a disclosed embodiment. The drive motor cooling system includes a drive motor fluid pump system 202 having a drive motor fluid pump 204, a coolant reservoir 206 and electronics 208. In the illustrated embodiment, the fluid is oil. The drive motor fluid pump 204 pumps fluid between the drive motor 102A and/or 102B, the fluid reservoir 206, and a heat exchanger 210. In one embodiment, the heat exchanger exchanges heat from the oil based drive motor fluid with water or alcohol based coolant and routes the water or alcohol based coolant to a radiator 212 for cooling. In general, any desired liquid medium for coolant may be used in any desired embodiment. The heat exchanger may include another pump to circulate the water or alcohol based coolant. The heat exchanger 210, in the illustrated embodiment couples to coolant tubes 214 adjacent to or running through the components of the battery 106. In other embodiments, the drive motor fluid pump 204 may couple directly to the coolant tubes 214 of the battery 106 and/or to the radiator 212. The drive motor fluid pump 204 is controlled by electronics 208, which may include a digital computer and other related components. The drive motor fluid pump 204 may include control valves to control flow of fluid between the drive motor 102A and/or 102B, the reservoir 206, and the heat exchanger 210 (and battery 106 coolant tubes 214 in other embodiments). The heat exchanger 210 may also include valves to direct the flow of coolant to the battery 106 coolant tubes 214 and to the radiator 212, under control of electronics 208 in some embodiments.

Various examples of reservoirs for use in thermal systems are provided herein. Any of these various examples of reservoirs may be used within various applications. Some applications include those tailored for any desired example of a battery powered electric vehicle (electric vehicle) such as described with respect to FIG. 1 and may be tailored for any desired example of a drive motor cooling system and/or a battery heating system as described with respect to FIG. 2. Such examples of reservoirs may be viewed as being part of an integrated coolant bottle assembly. For example, such a reservoir may be viewed as a bottle, a coolant bottle, etc. that is a portion of an integrated coolant bottle assembly that allows for one or more components to be coupled to, attached to, and/or connected to the reservoir. In addition, the reservoir itself may be fabricated such that one or more integrated channels are included within one or more portion of the reservoir that allow for one or more pathways between the one or more components, one or more hose interfaces, etc.

FIG. 3A is a diagram illustrating an example 301 of a reservoir for use within a thermal system in accordance with the present invention. In general, such a reservoir 206-1 include an input/output port 310-1 via which some liquid medium (e.g., any desired type of fluid such as coolant liquid, anti-freeze, water, an alcohol based agent, a heating agent, etc. and/or any desired combination of any such liquid mediums) may be added to the reservoir 206-1 and/or removed there from. Such an input/output port 310-1 may include a cap or some secured mechanism by which the liquid medium is prevented from escaping from the reservoir 206-1 and to ensure other elements do not enter the reservoir 206-1. The reservoir 206-1 is designed such that one or more components that operate in accordance with the thermal system (e.g., shown as components 320-1 and 320-2). Examples of components may include anything that is part of the thermal system and/or anything that is part of a system in which the thermal system is situated. For example, considering the example of a thermal system implemented within a vehicle (e.g., battery powered electric vehicle (electric vehicle)), examples of such components may include any one or more of a pump (e.g., a battery pump, a powertrain pump, etc.), a chiller, a heater, a filter, an aerator, a valve, a connector, a fan, a radiator, etc. and/or any other components known in the art as related to such thermal systems.

In this example 301, the reservoir 206-1 includes one or more interfaces at which one or more of the components 320-1 and 320-2 may be coupled, attached, and/or connected to the reservoir 206-1. In addition, the reservoir 206-1 may optionally include one or more hose interfaces 340-1 at which one or more hoses may be coupled to, attached to, and/or connected to the reservoir 206-1. The reservoir 206-1 allows for both integration of one or more components as well as for hose-based interfacing of one or more other components. Also, the reservoir 206-1 include an integrated channel 330-1 via which the liquid medium is transported between the components 320-1 and 320-2. The integrated channel 330-1 is formed within at least one portion of the reservoir 206-1 during its fabrication, molding, generation, etc. That is to say, during the manufacturing of the reservoir 206-1, the integrated channel 330-1 is formed therein and between interfaces at which the components 320-1 and 320-2 may be connected. Then, when one or both of the components 320-1 and 320-2 is/are interfaced with the reservoir 206-1, the integrated channel 330-1 provides interconnection between the components 320-1 and 320-2.

In some examples, such integrated channels may be formed based on hollowed using slides that are pulled along the axis of a cylindrical channel. Such a technique may be used to form multiple integrated channels (e.g., flow channels) in several orientations within a given portion of a reservoir. In addition, such construction may be used to form integrated tees that would have otherwise required external hoses and fittings.

By using integrated channels within the body of the reservoir, the reservoir itself includes various integrated channels that operate to direct the flow of the liquid medium directly into various components that are integrated with the coolant bottle (e.g., such as a chiller, a battery pump, a powertrain pump, etc.). This will obviate any need to attach these components separately to the vehicle and to attach these components via hoses and clamps to the reservoir. Instead, a unitary reservoir design structure can be formed to generate an integrated coolant bottle assembly, and such an integrated coolant bottle assembly can then be bolted to and installed within a vehicle relatively easily (e.g., using as few as two bolts in some examples). Also, in some implementations, such an integrated coolant bottle assembly can be connected to such a vehicle's electrical system using a single electrical connector that includes the respective electrical leads therein that correspond to each of the pertinent electrical components as opposed to requiring time-consuming connection of each respective electrical component via a separate respective electrical connector. Moreover, in other implementations, temperature sensors are also integrated into specific integrated channels (e.g., flow channels) at locations where it is desired to obtain measurements of the fluid medium. Such integration of temperature sensors directly into the ports of the coolant bottle eliminates the need for additional external parts, seals and clamps.

FIG. 3B is a diagram illustrating another example 302 of a reservoir for use within a thermal system in accordance with the present invention. The reservoir 206-2 includes an input/output port 310-2. Also, the reservoir 206-2 has integrated therewith components 320-3, 320-3, 320-5, and 320-6 that are attached thereto. Moreover, the reservoir 206-2 has integrated therewith a pump 312 and a chiller 314. Note that different embodiments of reservoirs may be of different sizes, shapes, forms, etc. and may include different respective numbers and types of components integrated therewith as may be desired and/or needed within a particular implementation and design of a thermal system. In addition, reservoir 206-2 optionally includes hose interfaces 340-2 and 340-3. As desired, any number of integrated channels may be included within a portion of the reservoir 206-2. For example, an integrated channel 330-2 provides a pathway for the liquid medium between chiller 314 and component 320-5. Other integrated channels are also shown as providing respective pathways between various elements associated with the reservoir 206-2 in the diagram. Also, note that the manner by which any of the pump 314, chiller 314, and components 320-3 to 320-5 interface to, connect to, couple to, etc. the reservoir 206-2 may be varied. For example, the component 320-3 is shown as be associated with and interfaces to the reservoir 206-2 at a lower end portion of the reservoir 206-2. The pump 312 and chiller 314 are shown as be associated with and interfaces to the reservoir 206-2 at upper respective portions of the reservoir 206-2. The component 320-6 is shown as being substantially centrally associated with the reservoir 206-2 and being provided integrated pathways to multiple respective other components (e.g., components 320-4 and 320-5 and pump 312 and optionally to hose interface 340-3).

FIG. 3C is a diagram illustrating another example 303 of a reservoir for use within a thermal system in accordance with the present invention. The reservoir 206-3 includes an input/output port 310-3 and at least two components 330-7 and 330-8. In this example 303, note that reservoir 206-3 includes a recess into which the component 330-8 fits when interfaced to the reservoir 206-3. In general, a reservoir designed in accordance with the principles herein may include any number of recesses, orifices, faces, ports, etc. that allow one or more components to interface to the reservoir.

In this example 303, the reservoir 206-3 itself includes an integrated channel 330-3 that provides a pathway for the liquid medium between components 330-7 and 330-8. In general, a particular design of a reservoir can include any one or more types of interfaces that are suitably designed and tailored to allow for the coupling, connection, etc. of any desired types of components to the reservoir 206-3. As with other examples herein, note that any one or more hose interfaces may also be included within a given design of a reservoir. A designer has total flexibility to decide how many components to integrate to the reservoir design and how many, if any, are to interact with the reservoir via hose interfaces.

FIG. 3D is a diagram illustrating another example 304 of a reservoir for use within a thermal system in accordance with the present invention. A reservoir 206-4 includes a first section of reservoir 206-4 and a second section of reservoir 206-4 that are joined together via a reservoir interface 304 to form the reservoir 206-4. For example, the connectivity, coupling, joining, etc. at the reservoir interface 304 may be achieved using any desired means (e.g., a weld interface, a glued interface, a hot molded interface, a hot plate weld interface, thermal weld interface, a sonic weld interface, an ultrasonic weld interface, etc. and/or any other means by which two sections of a reservoir may be joined together). Note that different means of joining the respective sections of a reservoir may be used based on various considerations including the material(s) used to construct the reservoir. Regardless of the particular material(s) used to construct the reservoir and regardless of the manner by which the respective sections of the reservoir are joined together, such a reservoir may be designed to include any desired number of sections (e.g., 2, 3, 4, or any positive integer greater than 1). In general, a reservoir as designed herein can include multiple sections (e.g., two halves) of the reservoir that are manufactured with integrated channels (e.g., flow channels) that are formed by the intersection of the core and cavity of the mold(s) of the respective sections of the reservoir.

From certain perspectives, the reservoir of this diagram may be viewed as including a first section and a second section. The second section is joined to the first section at a reservoir interface thereby forming a reservoir that is configured to facilitate at least one of storage or flow of a liquid medium. Also, in some examples, the first section or the second section includes an integrated channel that provides a pathway for the flow of the liquid medium.

In some examples, the component interface is also configured to facilitate connection of a component thereto, and the integrated channel provides the pathway for the flow of the liquid medium to or from the component interface. Also, note that the component may include any of a number of different types of components including any one of a pump, a battery pump, a powertrain pump, a chiller, a heater, a filter, an aerator, a valve, a connector, a fan, a radiator, etc. and/or any other components known in the art as related to such thermal systems.

In addition, in some examples, the reservoir includes a first component interface configured to facilitate connection of a first component thereto as well as a second component interface configured to facilitate connection of a second component thereto. In some situations, the integrated channel provides the pathway for the flow of the liquid medium from the first component interface to the second component interface.

Also, in other examples, the reservoir includes a hose interface configured to facilitate connection of a hose to transport the liquid medium to or to receive the liquid medium from another component that is located remotely from the reservoir and coupled to the reservoir by the hose. In even other examples, the reservoir includes a recess configured to facilitate connection of a component. In some implementations, the integrated channel provides the pathway for the flow of the liquid medium to or from the recess.

Note that such a reservoir as described with respect to this diagram and/or any other diagram, example, embodiment, etc. herein and/or their equivalents may be implemented in a variety of applications including a drive motor cooling system and/or a battery heating system of a battery powered electric vehicle.

FIG. 4A is a diagram illustrating another example 401 of a reservoir for use within a thermal system in accordance with the present invention. A reservoir 206-5 includes a first section of reservoir 206-5 and a second section of reservoir 206-6 that are joined together at a first reservoir interface 304-1 to form part of the reservoir 206-5. The reservoir 206-5 includes another section of reservoir 206-5 that is joined to the second section of reservoir 206-6 at a second reservoir interface 304-2 to form another part of the reservoir 206-5. In general, any number (e.g., two or more) of different sections of a reservoir may be joined together at any desired number of reservoir interfaces (e.g., a first reservoir interface 304-1, a second reservoir interface 304-2, and so on to an $n^{th}$ reservoir interface 304-3).

FIG. 4B is a diagram illustrating another example 402 of a reservoir for use within a thermal system in accordance with the present invention. A reservoir 206-6 includes multiple section of reservoir 206-6 (e.g., including a first section of reservoir 206-6) that are joined at various reservoir interfaces 304-4 and 304-5. This diagram shows an example of four substantially similarly-sized sections of the reservoir 206-6.

FIG. 4C is a diagram illustrating another example 403 of a reservoir for use within a thermal system in accordance with the present invention. A reservoir 206-7 includes multiple section of reservoir 206-7 (e.g., including a first section of reservoir 206-7) that are joined at various reservoir interfaces (e.g., including reservoir interface 304-6). This diagram shows an example of three sections of the reservoir 206-7 that are of different respective sizes.

FIG. 4D is a diagram illustrating another example 404 of a reservoir for use within a thermal system in accordance with the present invention. A reservoir 206-8 includes two respective sections that are joined together and form a channel at the reservoir interface 304-7 between the two respective sections. An integrated channel 330-3 is formed at the interface between the two respective sections of the reservoir 206-8 and provides a pathway for the liquid medium to be transported between components 330-9 and 330-10.

A first portion of the integrated channel 330-3 is within a first or top section of the reservoir 206-8, and a second portion of the integrated channel 330-3 is within the second or bottom section of the reservoir 206-8. The sections of the reservoir 206-8 are fabricated such that when they are joined together, the integrated channel 330-3 is formed at the reservoir interface 304-7 where the first portion of the integrated channel 330-3 complementarily aligns with second portion of the integrated channel 330-3 at the reservoir interface 304-7. Note that any desired proportions of the integrated channel 330-3 may be fabricated using the two respective sections of the reservoir 206-8 (e.g., one-half in each section, a fourth in one section and three-fourths in the other section, X % in one section and (1−X) % in the other section wherein X is any desired number between 0 and 100). In other examples, note that one or more integrated channels may be formed at a reservoir interface, and one or more other integrated channels may be included within one or more sections of a reservoir. For example, during manufacturing of a reservoir, the integrated channels (e.g., flow paths) can be formed by creating recesses within respective portions of the reservoir structures, forming smooth cylindrical or tubular flow channels, with no weld points located along the channels themselves.

FIG. 5 is a diagram illustrating an example 500 of a portion of a reservoir for use within a thermal system in accordance with the present invention. This diagram shows a first section of reservoir 206-9 that includes multiple hose interfaces (e.g., hose interfaces 340-4, 340-5, 340-6, and 340-7) and multiple integrated channels (e.g., integrated channels 330-4, 330-5, and 330-6). Also, this first section of reservoir 206-9 includes a multi-path valve mounting interface 510 at which a multi-path valve may be interfaced with this first section of reservoir 206-9. In some examples, such a multi-path valve is included in within the multi-path valve mounting interface 510 that provides for a smooth, unobstructed and integrated multi-path valve to be interfaced within the first section of reservoir 206-9. In some examples, the valve stem of such a multi-path valve is uniquely shaped, and its orientation can be manipulated to achieve desired flow configurations, or combinations of flow configurations, including blend modes. Using the valve stem of such a multi-path valve allows the coolant loops to be combined in parallel, or operated in series mode, as well as allowing certain thermal components to be bypassed when not required.

Note that various reservoirs may have different shapes, forms, etc. and may include different types of mounting interfaces to allow for different types of components to be mounted onto the reservoir.

FIG. 6 is a diagram illustrating another example 600 of a portion of a reservoir for use within a thermal system in accordance with the present invention. This diagram shows a first section of reservoir 206-10 that includes at least one hose interface (e.g., hose interface 340-8), at least one integrated channel (e.g., integrated channel 330-7), and at least one component mounting interface (e.g., component mounting interface 610). In addition, this diagram shows a reservoir interface 304-8 at which the first section of reservoir 206-10 may be joined with at least one other section of reservoir 206-10. In some examples, note that the example 600 that shows the first section of reservoir 206-9 corresponds to another perspective view of the first section of reservoir 206-9 in the example 500 of FIG. 5.

FIG. 7 is a diagram illustrating another example 700 of a portion of a reservoir for use within a thermal system in accordance with the present invention. This diagram shows a first section of reservoir 206-11 that includes at least one hose interface (e.g., hose interface 340-9). Also, this diagram shows multiple reservoir interfaces 304-9 including the section's perimeter edge and internal faces, edges, surfaces, etc. For example, note that the first section of reservoir 206-11 may be joined to another section of reservoir 206-11 not only along the section's perimeter edge, but also at one or more additional internal faces, edges, surfaces, etc. Note that such internal faces, edges, surfaces, etc. may be designed so that they substantially or approximately align with other internal faces, edges, surfaces, etc. or another section of reservoir 206-11 when the respective sections of reservoir 206-11 are joined together. In some examples, note that the example 700 that shows the first section of reservoir 206-11 corresponds to another perspective view of the first section of reservoir 206-9 in the example 500 of FIG. 5 and/or of the first section of reservoir 206-10 in the example 600 of FIG. 6. In some examples, note that the hose interface 340-9 corresponds to another perspective view of hose interface 340-4 as shown in FIG. 5.

FIG. 8 is a diagram illustrating another example 800 of a portion of a reservoir for use within a thermal system in accordance with the present invention. This diagram shows a first section of reservoir 206-12 that includes at least one component mounting interface that allows for at least one component to interface to, connect to, couple to, etc. the reservoir 206-12. For example, the first section of reservoir 206-12 includes component mounting interface 610-1 that allows for component 320-11 to be mounted thereon.

Note also that any of the various components described herein may be interfaced to, connects to, couples to, etc. a particular section of a reservoir before the reservoir (and its accompanying components) are installed within a thermal system such as may be included within a vehicle (e.g., battery powered electric vehicle (electric vehicle), a conventionally-gas powered vehicle, a diesel fuel powered vehicle, a natural gas powered vehicle, a solar powered vehicle, and/or any other type of vehicle).

In addition, note that a reservoir designed in accordance with such an integrated coolant bottle assembly in accordance with the principles described herein may be included within any desired thermal system application. Some implementation examples include vehicles and may include battery powered electric vehicles (electric vehicles). However, other implementation examples include electric power generators that may include motor-based systems (e.g., stationary/fixed location generators, mobile generators, etc.). Even other implementation examples include any type of components that may be included within physical plant installations (e.g., power plants, oil refineries, etc.) such as pumps, scrubbers, mixers, blowers, vacuums, etc. and/or any other components implemented within such applications and/or installations. In general, any thermal system that includes one or more reservoirs may be adapted with an integrated coolant bottle assembly based on the principles described herein and in accordance with the various aspects, embodiments, and/or examples of the invention.

Note that certain of the following several diagrams may be viewed in cooperation with one another as they are based on different views, perspectives, etc. of an alternative configuration of a reservoir in accordance with various aspects, embodiments, and/or examples of the invention. For example, this alternative configuration of a reservoir that, when implemented with various components, etc., includes different respective sections of the reservoir (e.g., at least a $1^{st}$ and $2^{nd}$ section of the reservoir), a chiller, multiple pumps, a multi-path valve (e.g., 5-way valve), an actuator configured to operate cooperatively with the multi-path valve, among other elements.

FIG. 9 is a diagram illustrating another example 900 of a reservoir for use within a thermal system in accordance with the present invention. This diagram is an alternative example 900 of a reservoir that includes a $1^{st}$ section of the reservoir 206-13 and a $2^{nd}$ section of the reservoir 206-14 that, when implemented in conjunction with one another, form a reservoir. Note that the connectivity, coupling, joining, etc. at a reservoir interface at which the $1^{st}$ section of the reservoir 206-13 and the $2^{nd}$ section of the reservoir 206-14 are joined may be achieved using any desired means (e.g., a weld interface, a glued interface, a hot molded interface, a hot plate weld interface, thermal weld interface, a sonic weld interface, an ultrasonic weld interface, etc. and/or any other means by which two sections of a reservoir may be joined together).

The reservoir includes a number of interfaces at which various components may be implemented to operate cooperatively with the reservoir and the thermal system of which the reservoir is part. For example, a component 320-12 (e.g., a pump) is configured to be mounted to, connect to, and/or couple to the $2^{nd}$ section of the reservoir 206-14 based on a component mounting interface 610-2. A component 320-13 (e.g., another pump) is configured to be mounted to, connect to, and/or couple to the $2^{nd}$ section of the reservoir 206-14 based on a component mounting interface 610-3. In an example of operation and implementation, the component 320-12 (e.g., pump) and the component 320-13 (e.g., another pump) operate to facilitate the flow of coolant at different respective rates (e.g., based on control signaling from electronics of a coolant system) within the overall coolant system.

As some other examples, a component 320-14 (e.g., a multi-path valve that is internally mounted) is configured to be mounted to, connect to, and/or couple to the $2^{nd}$ section of the reservoir 206-14 based on a component mounting interface 610-4. Note that the component 320-14 (e.g., a multi-path valve) is mounted internally to the reservoir and also serves, at least partially, as a component mounting interface on which another component 320-15 (e.g., an actuator) is mounted. For example, the component 320-12 (e.g., a multi-path valve) mounted internally to an opening, orifice, etc. of the $2^{nd}$ section of the reservoir 206-14, and the component 320-15 (e.g., an actuator) is mounted to and interacts, during operation, with the component 320-12 (e.g., a multi-path valve) as well as based on the component mounting interface 610-4. In an example of operation and implementation, the component 320-15 (e.g., an actuator) operates to place the component 320-12 (e.g., a multi-path valve) into different respective configurations (e.g., based on control signaling from electronics of a coolant system) to direct the flow of coolant in different respective directions within the overall coolant system.

This particular configuration shows how one or more components may operate cooperatively to serve as a component mounting interface in conjunction with the reservoir. Also, a component 320-15 (e.g., a chiller) is configured to be mounted to, connect to, and/or couple to the $1^{st}$ section of the reservoir 206-13 based on a component mounting interface 610-5. In addition, the $2^{nd}$ section of the reservoir 206-14 includes multiple hose interfaces (e.g., hose interface 340-10). Note that the hose interface 340-10 is of a different type and form than other hose interfaces described herein (e.g., hose interfaces 340-8 and 340-9). For example, from certain perspectives, the hose interface 340-9 and the hose interface 340-10 compare favorably, and from other perspectives, the hose interface 340-9 and the hose interface 340-10 compare unfavorably. For example, the hose interface 340-9 and the hose interface 340-10 provide interfaces by which hoses may be connected and/or coupled to a portion of a reservoir to operate cooperatively with the reservoir. However, the hose interface 340-10 included integrated elements (e.g., barbs, non-uniformities, etc.) that are implemented to permit a hose to interface thereto without requiring any hoses, clamps, etc. In some examples, such a hose to hose interface coupling, connection, etc. is implemented using a quick connect (e.g., such as a quick connect that includes one or more of o-rings, snap-rings, and/or other elements known in the art to facilitate coupling, connectivity, etc. of the hose to the hose interface).

In general, note also that the various component mounting interface may be of various types, shapes, forms, etc. As may be seen, different types of hose interfaces may be included within one or more portions of a reservoir. Also, different types of component mounting interfaces may be included within one or more portions of a reservoir based on the shape, properties, function, purpose, and/or characteristics of a given component. As can be seen in this diagram, different types of component mounting interfaces are included to facilitate the mounting of different types of components to the various portions of the reservoir.

FIG. 10 is a diagram illustrating another perspective 1000 of the example of the reservoir of FIG. 9. This other perspective 1000 shows an assembled view showing the $1^{st}$ section of the reservoir 206-13 and the $2^{nd}$ section of the reservoir 206-14 implemented in conjunction with one another forming the reservoir. Certain components are visible as being implemented on, mounted to, connected to, and/or coupled to the various portions of the reservoir. For example, the component 320-15 (e.g., the chiller) is shown as being implemented on, connected to, and/or coupled the $1^{st}$ section of the reservoir 206-13. The component 320-12 (e.g., the pump) and the component 320-13 (e.g., the other pump) are shown as being implemented on, mounted to, connected to, and/or coupled the $2^{nd}$ section of the reservoir 206-14. In addition, as can be seen in the diagram, multiple hose interfaces (e.g., hose interface 340-10) are also shown in this assembled view of the reservoir.

FIG. 11A is a diagram illustrating a side view 1101 of the perspective of the example of the reservoir of FIG. 9 and FIG. 10. This side view 1101 shows the assembled view showing the $1^{st}$ section of the reservoir 206-13 and the $2^{nd}$ section of the reservoir 206-14. This side view 1101 also shows component 320-15 (e.g., the chiller) as being implemented on, mounted to, connected to, and/or coupled the $1^{st}$ section of the reservoir 206-13 and the component 320-12 (e.g., the pump) as being implemented on, mounted to, connected to, and/or coupled to the $2^{nd}$ section of the reservoir 206-14.

FIG. 11B is a diagram illustrating another side view 1102 of the perspective of the example of the reservoir of FIG. 9 and FIG. 10. This side view 1102 also shows the assembled view showing the $1^{st}$ section of the reservoir 206-13 and the $2^{nd}$ section of the reservoir 206-14, yet from a different perspective. This side view 1102 also shows component 320-12 (e.g., the other pump) as being implemented with, connected to, and/or coupled to the $2^{nd}$ section of the reservoir 206-14.

In general, note that such a reservoir may be implemented in accordance with various aspects, embodiments, and/or examples of the invention based on a variety of configurations. For example, more or fewer component(s), more or fewer interface(s) (e.g., component, hose, and/or other element interface), more or fewer section(s)/portion(s), more or fewer integrated channel(s), more or fewer input/output port(s), etc. may be included within different implementations of such a reservoir. Considering some different examples, one type/design of reservoir may be specifically designed and adapted for use in one type of application (e.g., a car engine), while another type/design of reservoir may be specifically designed and adapted for use in another type of application (e.g., a semi-type truck engine), while yet another type/design of reservoir may be specifically designed and adapted for use in another type of application (e.g., a motor within a physical plant installations), and so on.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

As may also be used herein, the terms "electronics," "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network).

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments.

What is claimed is:

1. A reservoir configured for use in at least one of a drive motor cooling system or a battery heating system of a battery powered electric vehicle, the reservoir comprising:
    a first section; and
    a second section that is joined to the first section at a reservoir interface thereby forming a reservoir that is configured to facilitate at least one of storage or flow of a liquid medium within the at least one of the drive motor cooling system or the battery heating system of the battery powered electric vehicle, wherein the first section includes an integrated channel that provides a pathway for the flow of the liquid medium within the reservoir.

2. The reservoir of claim 1, wherein the first section further comprises:
    a component interface configured to facilitate connection of a component thereto, wherein the integrated channel provides the pathway for the flow of the liquid medium to or from the component interface.

3. The reservoir of claim 2, wherein the component includes a pump, a battery pump, a powertrain pump, a chiller, a heater, a filter, an aerator, a valve, a connector, a fan, or a radiator.

4. The reservoir of claim 1, wherein the first section further comprises:
    a hose interface configured to facilitate connection of a hose to transport the liquid medium to or to receive the liquid medium from another component that is located remotely from the reservoir and coupled to the reservoir by the hose.

5. The reservoir of claim 1, wherein the first section further comprises:
    a recess configured to facilitate connection of a component thereto, wherein the integrated channel provides the pathway for the flow of the liquid medium to or from the recess.

6. The reservoir of claim 1, wherein the second section is joined to the first section at the reservoir interface that is a weld interface, a glued interfaced, a hot molded interface, a hot plate weld interface, thermal weld interface, a sonic weld interface, or an ultrasonic weld interface.

7. A reservoir configured for use in at least one of a drive motor cooling system or a battery heating system of a battery powered electric vehicle, the reservoir comprising:
    a first section; and
    a second section that is joined to the first section at a reservoir interface thereby forming a reservoir that is configured to facilitate at least one of storage or flow of a liquid medium within the at least one of the drive motor cooling system or the battery heating system of the battery powered electric vehicle, wherein the first section includes an integrated channel that provides a pathway for the flow of the liquid medium within the reservoir;
    a component interface configured to facilitate connection of a component thereto, wherein the integrated channel provides the pathway for the flow of the liquid medium to or from the component interface; and
    a hose interface configured to facilitate connection of a hose to transport the liquid medium to or to receive the liquid medium from another component that is located remotely from the reservoir and coupled to the reservoir by the hose.

8. The reservoir of claim 7, wherein the component includes a pump, a battery pump, a powertrain pump, a chiller, a heater, a filter, an aerator, a valve, a connector, a fan, or a radiator.

9. The reservoir of claim 7, wherein the first section further comprises:
    a recess configured to facilitate connection of at least one other component thereto, wherein the integrated channel provides the pathway for the flow of the liquid medium to or from the recess.

10. The reservoir of claim 7, wherein the second section is joined to the first section at the reservoir interface that is a weld interface, a glued interfaced, a hot molded interface, a hot plate weld interface, thermal weld interface, a sonic weld interface, or an ultrasonic weld interface.

11. A reservoir configured for use in a drive motor cooling system and battery heating system of a battery powered electric vehicle, the reservoir comprising:
    a first section; and
    a second section that is joined to the first section at a reservoir interface thereby forming a reservoir that is configured to facilitate at least one of storage or flow of a liquid medium, wherein the first section includes an integrated channel that provides a pathway for the flow of the liquid medium within the reservoir.

12. The reservoir of claim 11, wherein the first section further comprises:
    a component interface configured to facilitate connection of a component thereto, wherein the integrated channel provides the pathway for the flow of the liquid medium to or from the component interface.

13. The reservoir of claim 12, wherein the component includes a pump, a battery pump, a powertrain pump, a chiller, a heater, a filter, an aerator, a valve, a connector, a fan, or a radiator.

14. The reservoir of claim 11, wherein the first section further comprises:
    a first component interface configured to facilitate connection of a first component thereto; and
    a second component interface configured to facilitate connection of a second component thereto, wherein the integrated channel provides the pathway for the flow of the liquid medium from the first component interface to the second component interface.

15. The reservoir of claim 14, wherein the component includes at least one of the first component or the second component includes a pump, a battery pump, a powertrain pump, a chiller, a heater, a filter, an aerator, a valve, a connector, a fan, or a radiator.

16. The reservoir of claim 11, wherein the first section further comprises:
    a hose interface configured to facilitate connection of a hose to transport the liquid medium to or to receive the liquid medium from another component that is located remotely from the reservoir and coupled to the reservoir by the hose.

17. The reservoir of claim 11, wherein the first section further comprises:
    a recess configured to facilitate connection of a component, wherein the integrated channel provides the pathway for the flow of the liquid medium to or from the recess.

18. The reservoir of claim 17, wherein the component includes a pump, a battery pump, a powertrain pump, a chiller, a heater, a filter, an aerator, a valve, a connector, a fan, or a radiator.

19. The reservoir of claim 11, wherein the second section is joined to the first section at the reservoir interface that is a weld interface, a glued interfaced, a hot molded interface, a hot plate weld interface, thermal weld interface, a sonic weld interface, or an ultrasonic weld interface.

20. The reservoir of claim 11, wherein the first section includes a first portion of another integrated channel that provides another pathway for the liquid medium, and the second section includes a second portion of another integrated channel provides the another pathway for the liquid medium, wherein the another integrated channel is formed along at least a portion of the reservoir interface where the first section is joined to the second section and where the first portion of the another integrated channel complementarily aligns with the second portion of the another integrated channel.

* * * * *